US007554222B2

(12) United States Patent
Kumfer et al.

(10) Patent No.: US 7,554,222 B2
(45) Date of Patent: Jun. 30, 2009

(54) MICRO-ELECTROMECHANICAL SYSTEM BASED SWITCHING

(75) Inventors: Brent Charles Kumfer, Farmington, CT (US); William James Premerlani, Scotia, NY (US); Kanakasabapathi Subramanian, Clifton Park, NY (US); Kuna Venkat Satya Rama Kishore, Bangalore (IN); John Park, Rexford, NY (US); Owen Schelenz, Schenectady, NY (US)

(73) Assignee: General Electric Company, Schenectady, NY (US)

(*) Notice: Subject to any disclaimer, the term of this patent is extended or adjusted under 35 U.S.C. 154(b) by 82 days.

(21) Appl. No.: 11/933,856

(22) Filed: Nov. 1, 2007

(65) Prior Publication Data

US 2009/0115255 A1 May 7, 2009

(51) Int. Cl.
*H02B 1/24* (2006.01)

(52) U.S. Cl. ........ 307/113

(58) Field of Classification Search ........ 307/113
See application file for complete search history.

(56) References Cited

U.S. PATENT DOCUMENTS

| | | | | |
|---|---|---|---|---|
| 3,496,409 | A | 2/1970 | Connell | 315/36 |
| 4,384,289 | A | 5/1983 | Stillwell et al. | |
| 4,723,187 | A | 2/1988 | Howell | |
| 4,827,272 | A | 5/1989 | Davis | |
| 4,847,780 | A | 7/1989 | Gilker et al. | |
| 5,374,792 | A | 12/1994 | Ghezzo et al. | |
| 5,426,360 | A | 6/1995 | Maraio et al. | |
| 5,430,597 | A | 7/1995 | Bagepalli et al. | 361/93 |
| 5,454,904 | A | 10/1995 | Ghezzo et al. | |
| 5,502,374 | A | 3/1996 | Cota | |
| 5,889,643 | A | 3/1999 | Elms | |
| 5,940,260 | A | 8/1999 | Gelbien et al. | |
| 5,943,223 | A | 8/1999 | Pond | 363/21 |
| 5,973,896 | A | 10/1999 | Hirsh et al. | |
| 6,054,659 | A | 4/2000 | Lee et al. | |
| 6,275,366 | B1 | 8/2001 | Gelbien et al. | |
| 6,563,683 | B1 | 5/2003 | Strumpler | 361/93.1 |
| 6,738,246 | B1 | 5/2004 | Strumpler | 361/93.1 |
| 2001/0014949 | A1 | 8/2001 | Leblanc | |
| 2002/0008149 | A1 | 1/2002 | Riley et al. | |

(Continued)

FOREIGN PATENT DOCUMENTS

DE 19850397 A1 5/2000

(Continued)

OTHER PUBLICATIONS

USPTO Office Action dated Oct. 17, 2008; Filing Date: Jun. 19, 2007; First Named Inventor: William James Premerlani; Confirmation No. 6421.

(Continued)

*Primary Examiner*—Robert L. Deberadinis
(74) *Attorney, Agent, or Firm*—Cantor Colburn LLP

(57) ABSTRACT

A current control device is disclosed. The current control device includes control circuitry integrally arranged with a current path and at least one micro electromechanical system (MEMS) switch pair disposed in the current path. The current control device further includes a hybrid arcless limiting technology (HALT) circuit connected in parallel with the at least one MEMS switch pair facilitating the opening of the at least one MEMS switch pair.

20 Claims, 9 Drawing Sheets

U.S. PATENT DOCUMENTS

| | | | | |
|---|---|---|---|---|
| 2002/0145841 | A1 | 10/2002 | Williams et al. | |
| 2003/0050737 | A1 | 3/2003 | Osann, Jr. | |
| 2003/0212473 | A1 | 11/2003 | Vandevanter | |
| 2004/0032320 | A1 | 2/2004 | Zalitzky et al. | |
| 2004/0113713 | A1 | 6/2004 | Zipper et al. | |
| 2004/0263125 | A1 | 12/2004 | Kanno et al. | |
| 2005/0085928 | A1 | 4/2005 | Shani | 700/18 |
| 2005/0248340 | A1 | 11/2005 | Berkcan et al. | |
| 2005/0270014 | A1 | 12/2005 | Zribi et al. | |
| 2006/0121785 | A1 | 6/2006 | Caggiano et al. | |
| 2006/0187688 | A1 | 8/2006 | Tsuruya | |
| 2006/0202933 | A1 | 9/2006 | Pasch et al. | |
| 2007/0013357 | A1 | 1/2007 | Huang et al. | 328/318 |
| 2007/0057746 | A1 | 3/2007 | Rubel | |
| 2007/0142938 | A1 | 6/2007 | Huang | 700/40 |
| 2007/0173960 | A1 | 7/2007 | Kumar | 700/40 |

FOREIGN PATENT DOCUMENTS

| | | | |
|---|---|---|---|
| DE | 19927762 | A1 | 1/2001 |
| EP | 0072422 | A1 | 2/1983 |
| EP | 0233756 | A1 | 8/1987 |
| EP | 0774822 | A1 | 5/1997 |
| EP | 1255268 | A1 | 11/2002 |
| EP | 1610142 | A1 | 12/2005 |
| EP | 1643324 | A2 | 4/2006 |
| EP | 1681694 | A1 | 7/2006 |
| GB | 2123627 | A | 2/1984 |
| WO | 9946606 | A2 | 9/1999 |
| WO | 0004392 | A1 | 1/2000 |
| WO | 2006078944 | A2 | 7/2006 |
| WO | 2006100192 | A1 | 9/2006 |

OTHER PUBLICATIONS

USPTO Office Action dated Oct. 24, 2008; Filing Date: Jun. 15, 2007; First Names Inventor: William James Permerlani; Confirmation No. 4167.

USPTO Office Action dated Oct. 28, 2008; Filing Date: Jun. 8, 2007; First Named Inventor: Cecil Rivers, Jr.; Confirmation No. 7895.

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Aurhority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

"Novel Concept for Medium Voltage Circuit Breakers Using Microswitches"; Authors: George G. Karady and G.T. Heydt; IEEE Transactions on Power Delivery, vol. 21, No. 1, Jan. 2006; pp. 536-537.

European Search Report; Application No. 07110554.8; Date of Mailing Oct. 30, 2007.

MICRO-ELECTROMECHANICAL SYSTEM BASED SWITCHING

BACKGROUND OF THE INVENTION

The present invention generally relates to switching devices for switching on/off a current in current paths, and more particularly to micro-electromechanical system based switching devices having multiple micro electromechanical switches arranged to provide higher voltage hold-off thresholds.

To switch on/off current in electrical systems, a set of contacts may be used. The contacts may be positioned as open to stop current, and closed to promote current flow. Generally, the set of contacts may be used in contactors, circuit breakers, current interrupters, motor starters, or similar devices. However, the principles of switching current on/off may be understood through explanation of a contactor.

A contactor is an electrical device designed to switch an electrical load ON and OFF on command. Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications, it may be desirable to protect the contactor from damage by backing it up with a series device that is sufficiently fast acting to interrupt fault currents prior to the contactor opening at all values of current above the interrupting capacity of the contactor.

Previously conceived solutions to facilitate use of contactors in power systems include vacuum contactors, vacuum interrupters and air break contactors, for example. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers, and capacitors, they are known to cause undesirable transient overvoltages, particularly as the load is switched off.

Furthermore, the electromechanical contactors generally use mechanical switches. However, as these mechanical switches tend to switch at a relatively slow speed, predictive techniques are employed in order to estimate occurrence of a zero crossing, often tens of milliseconds before the switching event is to occur, in order to facilitate opening/closing near the zero crossing for reduced arcing. Such zero crossing prediction is prone to error as many transients may occur in this prediction time interval.

As an alternative to slow mechanical and electromechanical switches, fast solid-state switches have been employed in high speed switching applications. These solid-state switches switch between a conducting state and a non-conducting state through controlled application of a voltage or bias. For example, by reverse biasing a solid-state switch, the switch may be transitioned into a non-conducting state. However, because solid-state switches do not create a physical gap between contacts as they are switched into a non-conducing state, they experience leakage current. Furthermore, due to internal resistances, if solid-state switches operate in a conducting state, they experience a voltage drop. Both the voltage drop and leakage current contribute to the generation of excess heat under normal operating circumstances, which may affect switch performance and life. Moreover, due at least in part to the inherent leakage current associated with solid-state switches, their use in circuit breaker applications is not practical.

While existing switch technology is adequate for its intended purposes, there exists a need in the art for a direct current control device and/or switch having a micro electromechanical switch arrangement with a high hold-off voltage that overcomes these drawbacks.

BRIEF DESCRIPTION OF THE INVENTION

A current control device is provided including a first micro electromechanical system (MEMS) switch. The first MEMS switch has a source connection, a drain connection and a gate control electrode. A second MEMS switch is also included that has a drain connection, a source connection, and a gate control electrode. The second MEMS source is arranged so that it is coupled to said the MEMS switch source connection. A circuit is electrically connected with the first and second MEMS switch to facilitate the opening of the first and second MEMS switch.

A current control device is also provided having a first pair of micro electromechanical system (MEMS). The first pair of MEMS switches includes a first and second MEMS switch arranged in series with the source connections of the first and second MEMS switches being directly coupled. A first gate driver is coupled to the first pair of MEMS switches and a circuit is electrically connected with the first gate driver switch to facilitate the opening of the first MEMS switch.

A current control device is provided having a first MEMS switch having a drain connection and a source connection. A second MEMS switch having drain connection, and a source connection is coupled to the first MEMS switch source connection. Wherein the first and second MEMS switches further have a single common gate connection coupled to the first and second MEMS switch source terminals. The gate connection is arranged to change the state of the first and second MEMS switch.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An exemplary embodiment provides an electrical interruption device suitable for arcless interruption of direct current. The interruption device includes micro electromechanical system (MEMS) switches. Use of MEMS switches provides fast response time. A Hybrid Arcless Limiting Technology (HALT) circuit connected in parallel with the MEMS switches provides capability for the MEMS switches to be opened without arcing at any given time regardless of current or voltage. Alternatively, a Pulse-Assisted Turn On (not shown) circuit connected in parallel with the MEMS switches provides capability for the MEMS switches to be closed without arcing at any given time.

Figure 1:
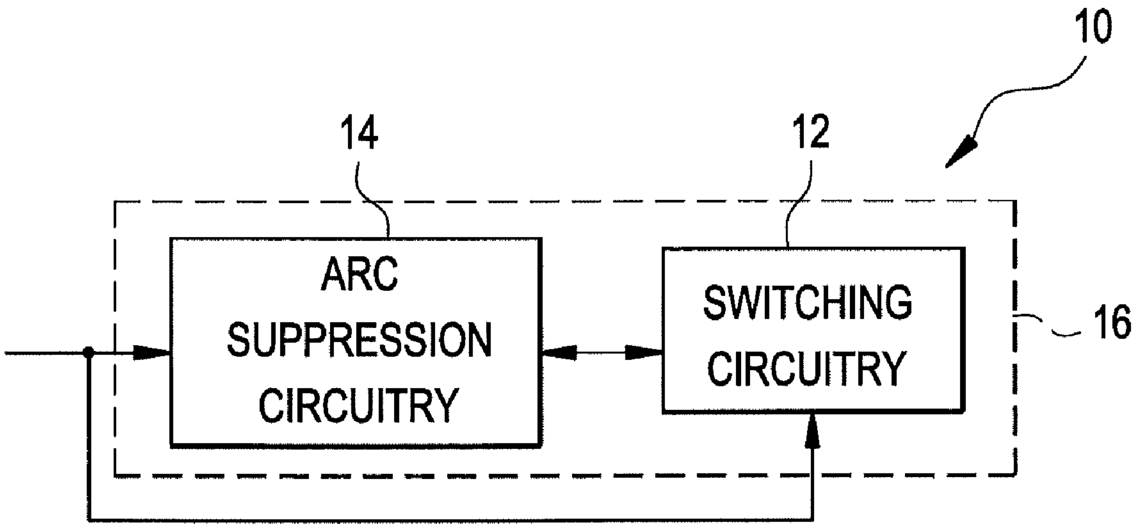
FIG. 1 is a block diagram of an exemplary MEMS based switching system in accordance with an exemplary embodiment.

FIG. 1 illustrates a block diagram of an exemplary arc-less micro-electromechanical system switch (MEMS) based switching system 10. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the embodiments should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14, alternatively referred to as a Hybrid Arcless Limiting Technology (HALT) device, is operatively coupled to the MEMS based switching circuitry 12. In certain embodiments, the MEMS based switching circuitry 12 may be integrated in its entirety with the arc suppression circuitry 14 in a single package 16, for example. In other embodiments, only certain portions or components of the MEMS based switching circuitry 12 may be integrated with the arc suppression circuitry 14.

In a presently contemplated configuration as will be described in greater detail with reference to FIG. 2 and FIG. 3, the MEMS based switching circuitry 12 may include one or more MEMS switch pairs. Additionally, the arc suppression circuitry 14 may include a balanced diode bridge and a pulse circuit. Further, the arc suppression circuitry 14 may be configured to facilitate suppression of an arc formation between contacts of the one or more MEMS switches by receiving a transfer of electrical energy from the MEMS switch in response to the MEMS switch changing state from closed to open. It may be noted that the arc suppression circuitry 14 may be configured to facilitate suppression of an arc formation in response to an alternating current (AC) or a direct current (DC).

Figure 2:
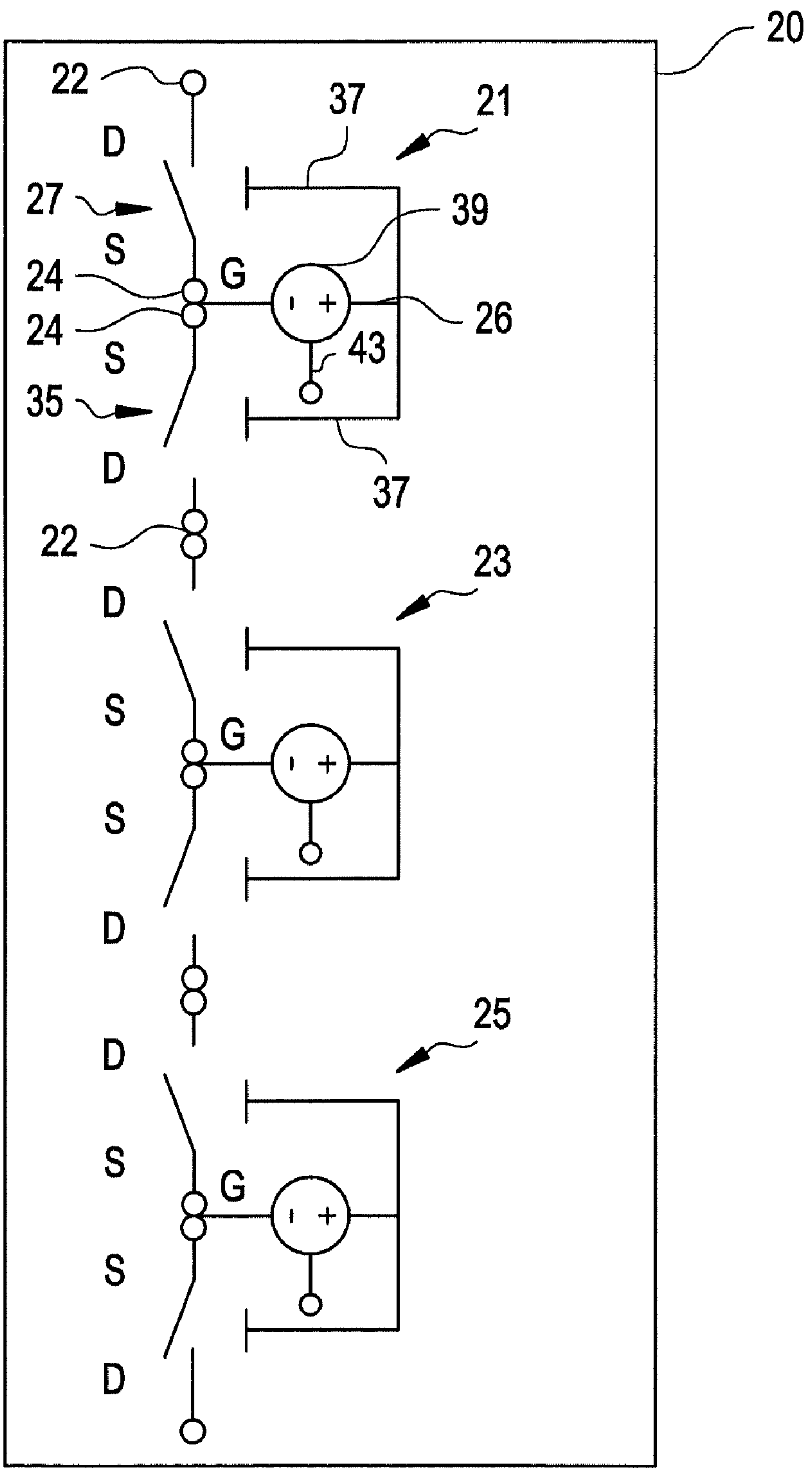
FIG. 2 is schematic diagram illustrating the exemplary MEMS based switching system depicted in FIG. 1.

As noted with reference to FIG. 1, the MEMS based switching circuitry 12 may include a MEMS switch array 20 as shown in FIG. 2. The MEMS switch array 20 is arranged in a serial connection as MEMS switch pairs 21, 23, 25. In the illustrated embodiment, a first MEMS switch pair 21 is depicted as having a first and second MEMS switch 27, 35. Each MEMS switch 27, 35 has a first connection 22, a second connection 24 and a gate control electrode 37. In one embodiment, the first connection 22 may be configured as a drain, the second connection 24 may be configured as a source and the gate control electrode 37 may be configured as a gate. In the embodiment illustrated in FIG. 2, the MEMS switches 27, 35 are arranged such that the source connection 24 of each MEMS switch 27, 35 is coupled in series to allow the gate control electrode 37 for each MEMS switch 27, 35 to share a single gate connection 26. The single gate connection 26 is connected to a single gate driver 39. The gate driver 39 includes a power supply input (not shown) and control logic input 43 that provides the means for changing the state of each MEMS switch 27, 35. This arrangement provides advantages by increasing the voltage handling characteristics of the MEMS switch array 20 without increasing the number of gate drivers 39. One or more additional MEMS switch pairs 23, 25 are serially connected to MEMS switch pair 21. The MEMS switch pairs 23, 25 are arranged such that one drain connection 22 of a MEMS switch pair is connected to the drain connection 22 of the adjoining MEMS switch pair.

Figure 3:
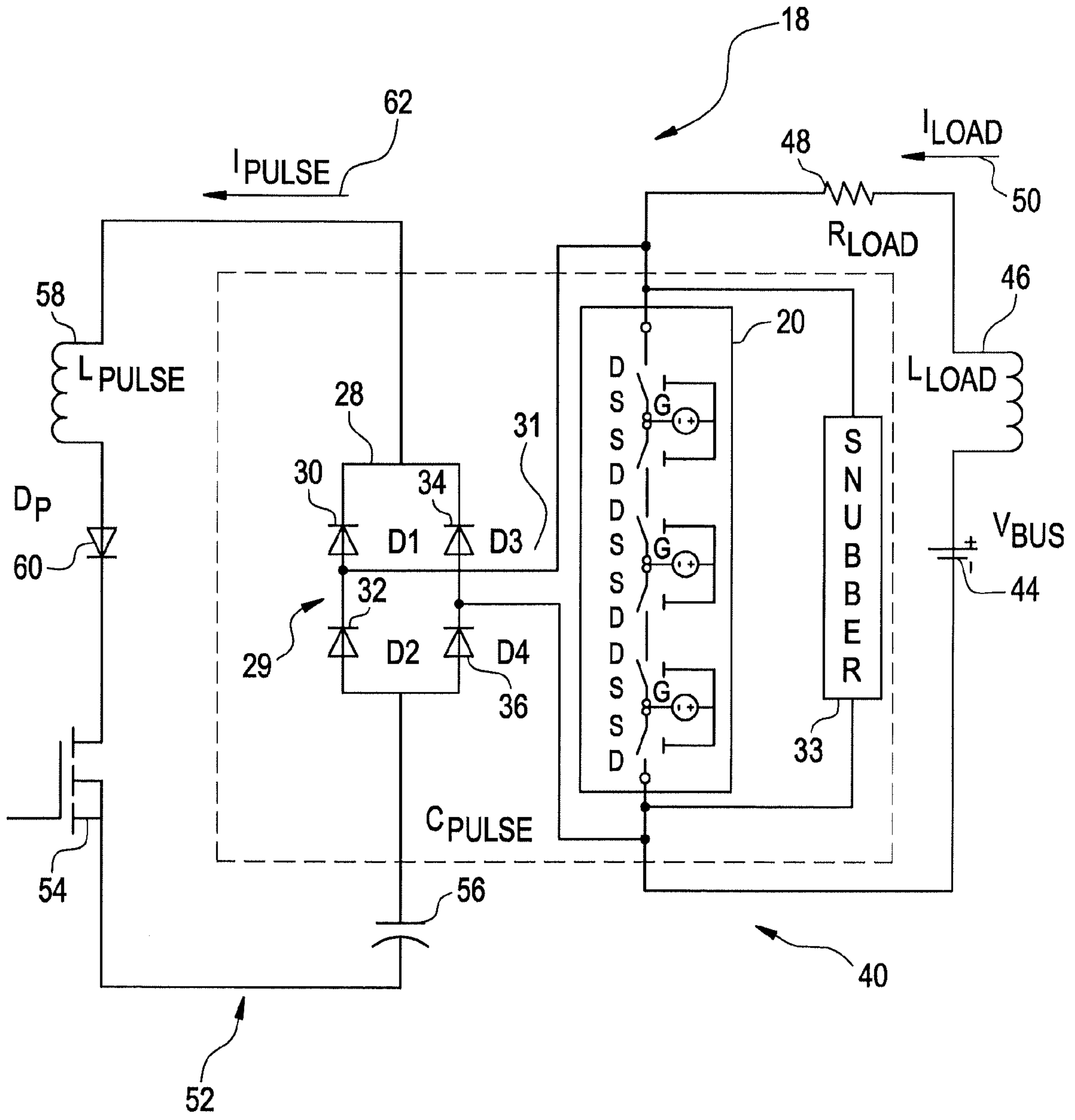
FIG. 3 is a schematic diagram illustrating an exemplary array of MEMS switch pairs depicted in FIG. 2

Turning now to FIG. 3, a schematic diagram 18 of the exemplary MEMS based switching system depicted in FIG. 1 is illustrated in accordance with one embodiment. A voltage snubber circuit 33 may be coupled in parallel with the MEMS switch array 20 and configured to limit voltage overshoot during fast contact separation as will be explained in greater detail hereinafter. In certain embodiments, the snubber circuit 33 may include a snubber capacitor (see 76, FIG. 5) coupled in series with a snubber resistor (see 78, FIG. 5). The snubber capacitor may facilitate improvement in transient voltage sharing during the sequencing of the opening of the MEMS switch array 20. Furthermore, the snubber resistor may suppress any pulse of current generated by the snubber capacitor during closing operation of the MEMS switch array 20. In certain other embodiments, the voltage snubber circuit 33 may include a metal oxide varistor (MOV) (not shown).

In accordance with further aspects of the present technique, a load circuit 40 may be coupled in series with the MEMS switch array 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the MEMS switch array 20.

Further, as noted with reference to FIG. 1, the arc suppression circuitry 14 may include a balanced diode bridge. In the illustrated embodiment, a balanced diode bridge 28 is depicted as having a first branch 29 and a second branch 31. As used herein, the term "balanced diode bridge" is used to represent a diode bridge that is configured such that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the MEMS switch array 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the MEMS switch array 20 and the balanced diode bridge 28 may be tightly packaged to facilitate minimization of parasitic inductance caused by the balanced diode bridge 28 and in particular, the connections to the MEMS switch array 20. It may be noted that, in accordance with exemplary aspects of the present technique, the MEMS switch array 20 and the balanced diode bridge 28 are positioned relative to one another such that the inherent inductance between the MEMS switch array 20 and the balanced diode bridge 28 produces a di/dt voltage less than a few percent of the voltage across the drain 22 and source 24 of each MEMS switch 27, 35 when carrying a transfer of the load current to the diode bridge 28 during the MEMS switch pairs 20 turn-off which will be described in greater detail hereinafter. In one embodiment, the MEMS switch array 20 may be integrated with the balanced diode bridge 28 in a single package 38 or optionally, the same die with the intention of minimizing the inductance interconnecting the MEMS switch array 20 and the diode bridge 28.

Additionally, the arc suppression circuitry 14 may include a pulse circuit 52 coupled in operative association with the balanced diode bridge 28. The pulse circuit 52 may be configured to detect a switch condition and initiate opening of the MEMS switch array 20 responsive to the switch condition. As used herein, the term "switch condition" refers to a condition that triggers changing a present operating state of the MEMS switch array 20. For example, the switch condition may result in changing a first closed state of the MEMS switch array 20 to a second open state or a first open state of the MEMS switch array 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the exemplary embodiment, the MEMS switch array 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch array 20.

Figure 4:
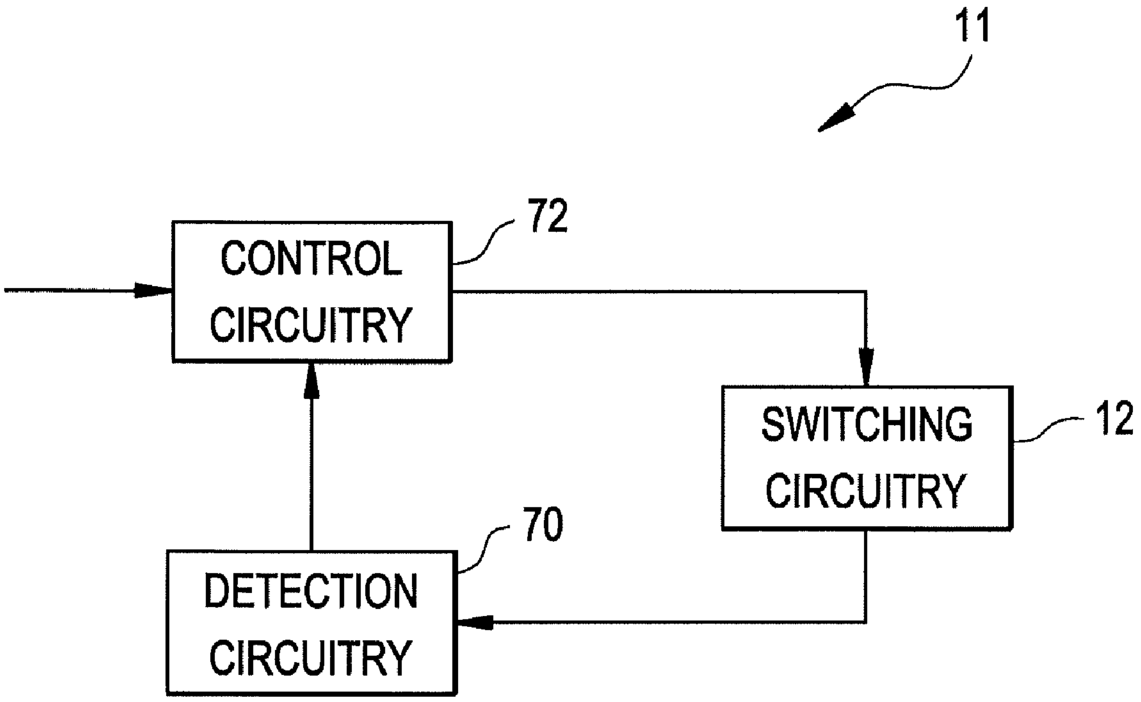
FIG. 4 is a block diagram of an exemplary MEMS based switching system in accordance with an exemplary embodiment and alternative to the system depicted in FIG. 1.

Reference is now made to FIG. 4, which illustrates a block diagram of an exemplary soft switching system 11, in accordance with aspects of the exemplary embodiment. As illustrated in FIG. 4, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the exemplary embodiment, the soft switching system 11 may be configured to perform soft or point-on-wave (PoW) switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As alluded to above and in accordance with one embodiment, the control circuitry 72 may be configured to synchronize the opening and closing of the one or more MEMS switches of the switching circuitry 12 with the occurrence of a zero crossing of an alternating source voltage or an alternating load circuit current.

Figure 5:
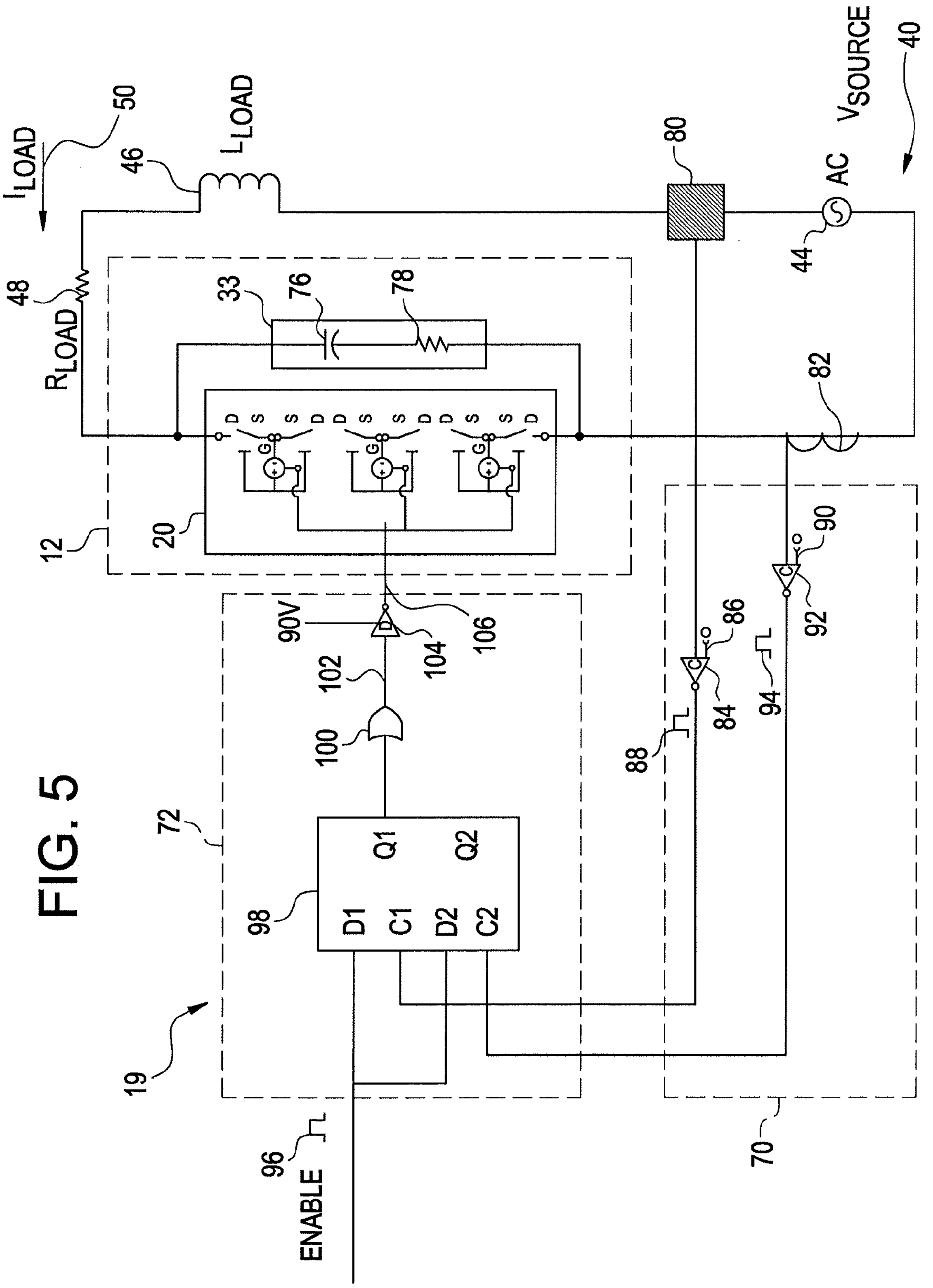
FIG. 5 is a schematic diagram illustrating the exemplary MEMS based switching system depicted in FIG. 3.

Turning to FIG. 5, a schematic diagram 19 of one embodiment of the soft switching system 11 of FIG. 4 is illustrated. In accordance with the illustrated embodiment, the schematic diagram 19 includes one example of the switching circuitry 12, the detection circuitry 70 and the control circuitry 72.

Although for the purposes of description, FIG. 2, FIG. 3 and FIG. 4 illustrate three MEMS switch pairs 21, 23, 25 in MEMS switch array 20, the MEMS switching array 20 may nonetheless include one or more MEMS switch pairs depending upon, for example, the current and voltage handling requirements of the soft switching system 11. In one embodiment, the switching circuitry 12 may also include a switch module including multiple MEMS switch pairs coupled together in a parallel configuration to divide the current amongst the MEMS switches. In yet a further embodiment, one or more MEMS switch pairs of the switching circuitry 12 may be integrated into a single package 74.

For further purposes of description, each of the MEMS switch pairs 21, 23, 25 will be described with respect to MEMS switch pair as discussed above with reference to FIG. 2. In one embodiment, the control circuitry 72 may be coupled to the gate driver 39 via a control logic input 43 to facilitate switching a current state of the MEMS switch 22. In the exemplary embodiment, the source 24 of MEMS switch 27 is coupled to the source 24 of MEMS switch 35. This arrangement allows the gate electrodes 37 for the MEMS switches 27, 35 to be coupled to a single gate driver 39 through a single gate connection 26. Thus, each MEMS switch pair has two MEMS switches that are driven by a single gate driver 39. As will be discussed in more detail below, this MEMS switch pair arrangement provides advantages by increasing the hold-off voltage of the switching circuitry 12 without increasing the number of gate drivers 39 needed to operate the MEMS switches. This allows for increased performance while minimizing the number of components and simplifying the system controls. Therefore, the associated manufacturing costs needed to achieve this higher voltage performance is improved.

Also, in certain embodiments, damping circuitry (snubber circuit) 33 may be coupled in parallel with the MEMS switch array 20 to delay appearance of voltage across the MEMS switch array 20. As illustrated, the damping circuitry 33 may include a snubber capacitor 76 coupled in series with a snubber resistor 78, for example.

Additionally, the MEMS switch array 20 may be coupled in series with a load circuit 40 as further illustrated in FIG. 5. In a presently contemplated configuration, the load circuit 40 may include a voltage source $V_{SOURCE}$ 44, and may possess a representative load inductance $L_{LOAD}$ 46 and a load resistance $L_{ROAD}$ 48. In one embodiment, the voltage source $V_{SOURCE}$ 44 (also referred to as an AC voltage source) may be configured to generate the alternating source voltage and the alternating load current $I_{LOAD}$ 50.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch array 20. More specifically, the control circuitry 72 may be configured to facilitate opening of the MEMS switch array 20 to interrupt or open the load circuit 40 responsive to a detected zero crossing of the alternating load current $I_{LOAD}$ 50. Additionally, the control circuitry 72 may be configured to facilitate closing of the MEMS switch array 20 to complete the load circuit 40 responsive to a detected zero crossing of the alternating source voltage.

In one embodiment, the control circuitry 72 may determine whether to switch the present operating state of the MEMS switch array 20 to a second operating state based at least in part upon a state of an Enable signal 96. The Enable signal 96 may be generated as a result of a power off command in a contactor application, for example. In one embodiment, the Enable signal 96 and the output signals 88 and 94 may be used as input signals to a dual D flip-flop 98 as shown. These signals may be used to close the MEMS switch array 20 at a first source voltage zero after the Enable signal 96 is made active (for example, rising edge triggered), and to open the MEMS switch array 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 102 may be generated. In one embodiment, the trigger signal 102 may be generated via a NOR gate 100, for example. The trigger signal 102 may in turn be passed through a driver 104 to generate a gate activation signal 106 which may be used to apply a control voltage to the control logic input 42 of gate driver 37 in each of the MEMS switch pair 21, 23, 25 in the MEMS switch array 20.

As previously noted, in order to achieve a desirable voltage rating for a particular application, the MEMS switch pairs 21, 23, 25 in MEMS switch array 20 may be operatively coupled in series with the drains of the MEMS switch pairs being connected to the drain of the adjoining MEMS switch pair. Each individual MEMS switch 27, 35 has an electrical characteristic referred to as a hold-off voltage. This is the voltage at which the MEMS switch is changes state from either open to close, or close to open under the influence of the electrostatic forces present in the MEMS switch. A typical MEMS switch has a hold-off voltage of approximately 100V. In certain applications, however, it is desirable to operate at higher voltages, such as 400V for example. Since the MEMS switches 27, 35 are arranged serially, the hold-off voltage for the pair is equal to the sum of the hold-off voltages for each individual MEMS switch. If the switches have the same hold-off voltage, 100V for example, the hold-off voltage for the MEMS switch pair 21 would be 2×, or 200V for example. Further, by arranging the MEMS switches 27, 35 with their respective sources connected, this increase in voltage hold-off capability is achieved without the use of any additional gate 26. Thus, the three MEMS switch pairs 21, 23, 25 could have 6× the hold-off voltage of a single MEMS switch while only having 3× the number of gate drivers. This arrangement provides a number of advantages in reducing the cost of materials and assembly.

It should be appreciated, that MEMS switch array 20 may include additional MEMS switch pairs may be arranged in parallel with MEMS switch pairs 21, 23, 25 to provide additional capacity to carry current. The combined capabilities of the MEMS switches may be designed to both increase the hold-off voltage and adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount or level of current that will be flowing at the moment of switching.

Figure 6:
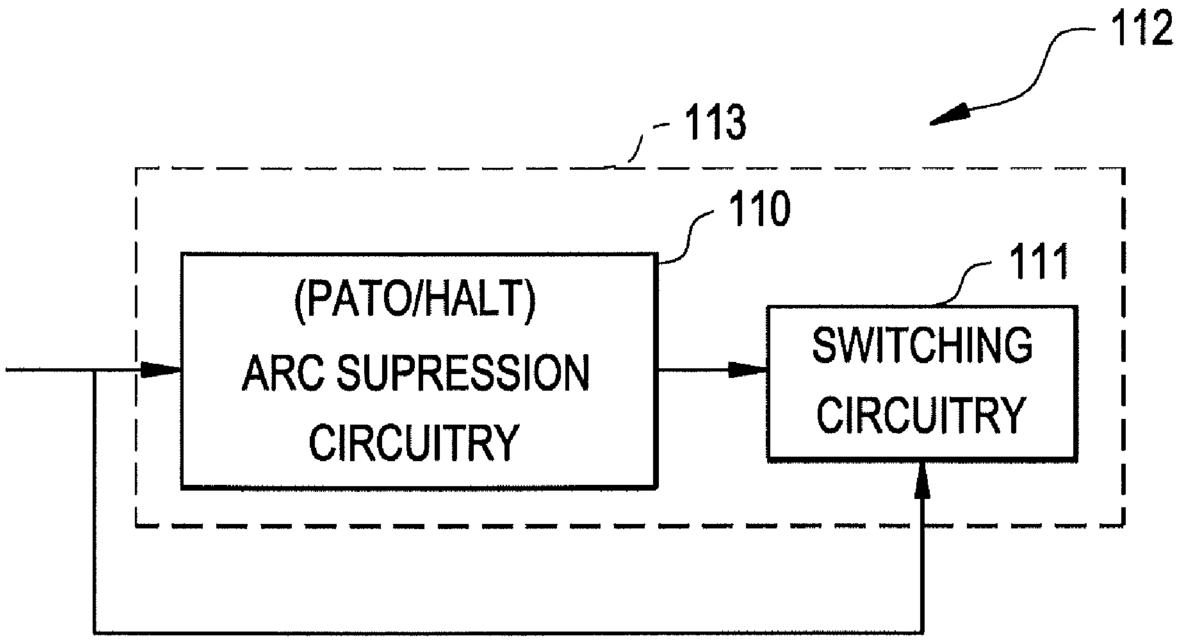
FIG. 6 is a block diagram of an exemplary MEMS based switching system in accordance with an exemplary embodiment.

However, example embodiments are not limited to arcless switching of alternating current and/or sinusoidal waveforms. As depicted in FIG. 6, example embodiments are also applicable to arcless switching of direct current and/or currents without naturally occurring zeros.

FIG. 6 illustrates a block diagram of an exemplary MEMS based switching system 112 in accordance with an exemplary embodiment. As illustrated in FIG. 6, the arcless MEMS based switching system 112 is shown as including MEMS based switching circuitry 111 and arc suppression circuitry 110, where the arc suppression circuitry 110, such as HALT and PATO circuitry for example, is operatively coupled to the MEMS based switching circuitry 111. In some embodiments, the MEMS based switching circuitry 111 may be integrated in its entirety with the arc suppression circuitry 110 in a single package 113, for example. In other embodiments, only certain portions or components of the MEMS based switching circuitry 111 may be integrated with the arc suppression circuitry 110.

The MEMS based switching circuitry 111 may include one or more MEMS switches. Additionally, the arc suppression circuitry 110 may include a balanced diode bridge and a pulse circuit and/or pulse circuitry. Further, the arc suppression circuitry 110 may be configured to facilitate suppression of an arc formation between contacts of the one or more MEMS switches by receiving a transfer of electrical energy from the MEMS switch in response to the MEMS switch changing state from closed to open (or open to closed). It may be noted that the arc suppression circuitry 110 may be configured to facilitate suppression of an arc formation in response to an alternating current (AC) or a direct current (DC).

However, example embodiments are not limited to current control devices including a single MEMS switch pair. For example, a plurality of MEMS switch pairs may be used to achieve a different voltage rating, or different current handling capabilities, compared to a single MEMS switch pair. For example, as discussed above, a plurality of MEMS switches may be connected in parallel to achieve increased current handling capabilities. Similarly, a plurality of MEMS switches may be connected in series to achieve a higher voltage rating. Furthermore, a plurality of MEMS switches may be connected in a network including combinations of series and parallel connections to achieve a desired voltage rating and current handling capabilities. All such combinations are intended to be within the scope of the exemplary embodiment.

Figure 7:
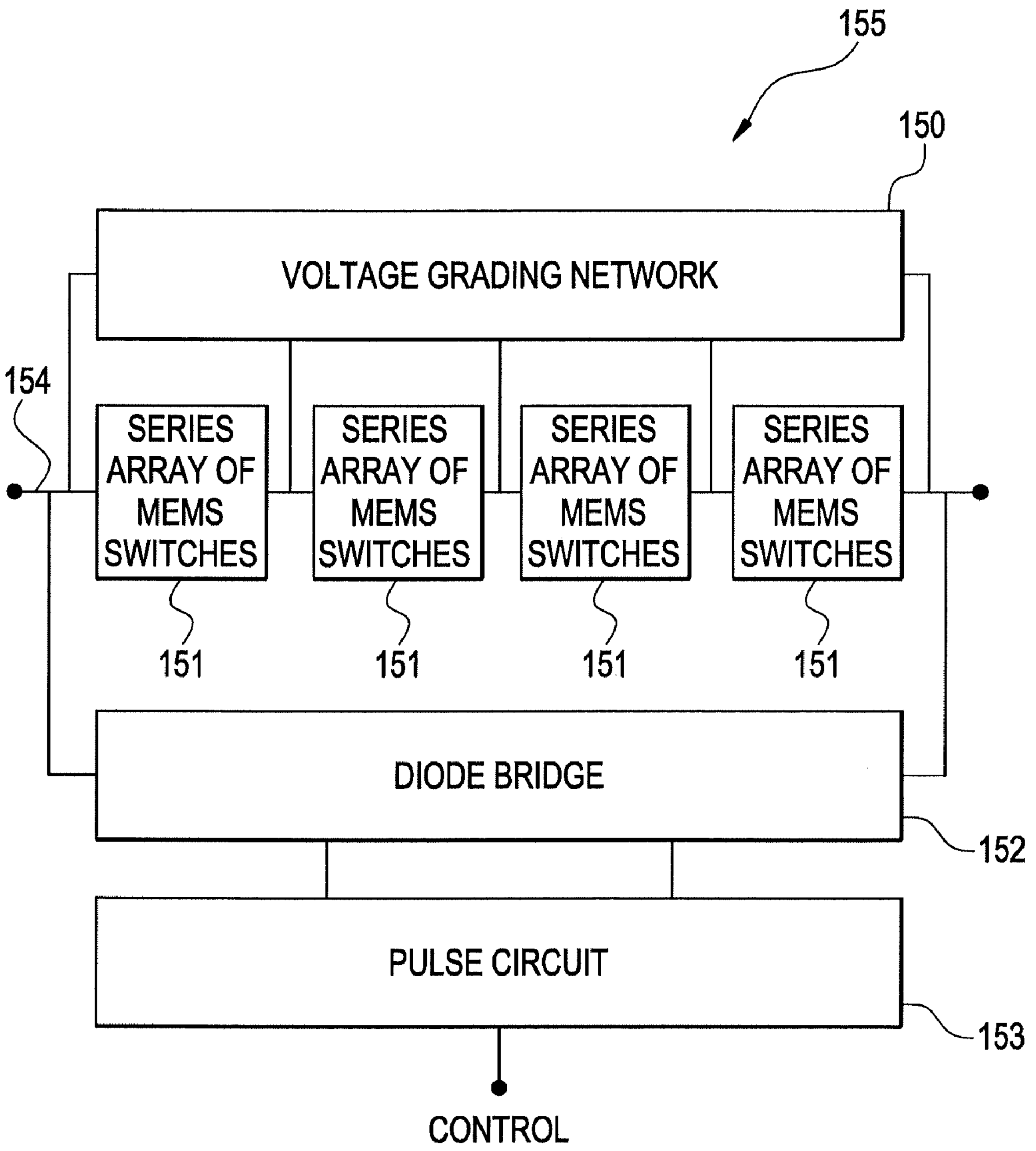
FIG. 7 is a block diagram of a MEMS switch array in accordance with an exemplary embodiment.

FIG. 7 is a block diagram of a MEMS switch array 155 in accordance with another exemplary embodiment, including a plurality of MEMS switch pairs with each MEMS switch pair arranged as discussed above with the source of each MEMS switch of the pair connected in series and to a single gate. As illustrated in FIG. 7, a plurality of parallel MEMS switch arrays 151 may be further connected in series in a current path 154. Each parallel MEMS switch array 151 may include a plurality of MEMS switches connected in parallel with each other. As further illustrated, a balanced diode bridge 152 may be connected in parallel with the plurality of parallel MEMS switch arrays 151. For example, the balanced diode bridge 152 may be substantially similar to the balanced diode bridge 28 illustrated in FIG. 2, or the balanced diode bridge 141 illustrated in FIG. 7. Also illustrated in FIG. 7 is pulse circuit 153 operatively connected to the diode bridge 152. For example, circuit 153 may include circuit 52 of FIG. 2. Therefore, circuit 153 may facilitate the opening and closing of the plurality of parallel MEMS switch arrays 151.

As further illustrated in FIG. 7, voltage-grading network 150 is connected across the plurality of parallel MEMS switch arrays 151, with electrical connections intermediate each array 151. The voltage grading network 150 may equalize voltage across the plurality of series MEMS switch arrays 151 For example, the voltage grading network 150 may include a network of passive components (e.g., resistors) to provide voltage apportionment across the plurality of series MEMS switch arrays 151, and/or a network of passive components (e.g., capacitors and/or varistors) to provide energy absorption to suppress overvoltages from inductive energy which may exist along the current path 154. Therefore, the MEMS switch array illustrated in FIG. 7 may be included in a current control device to control current along a current path.

Figure 8:
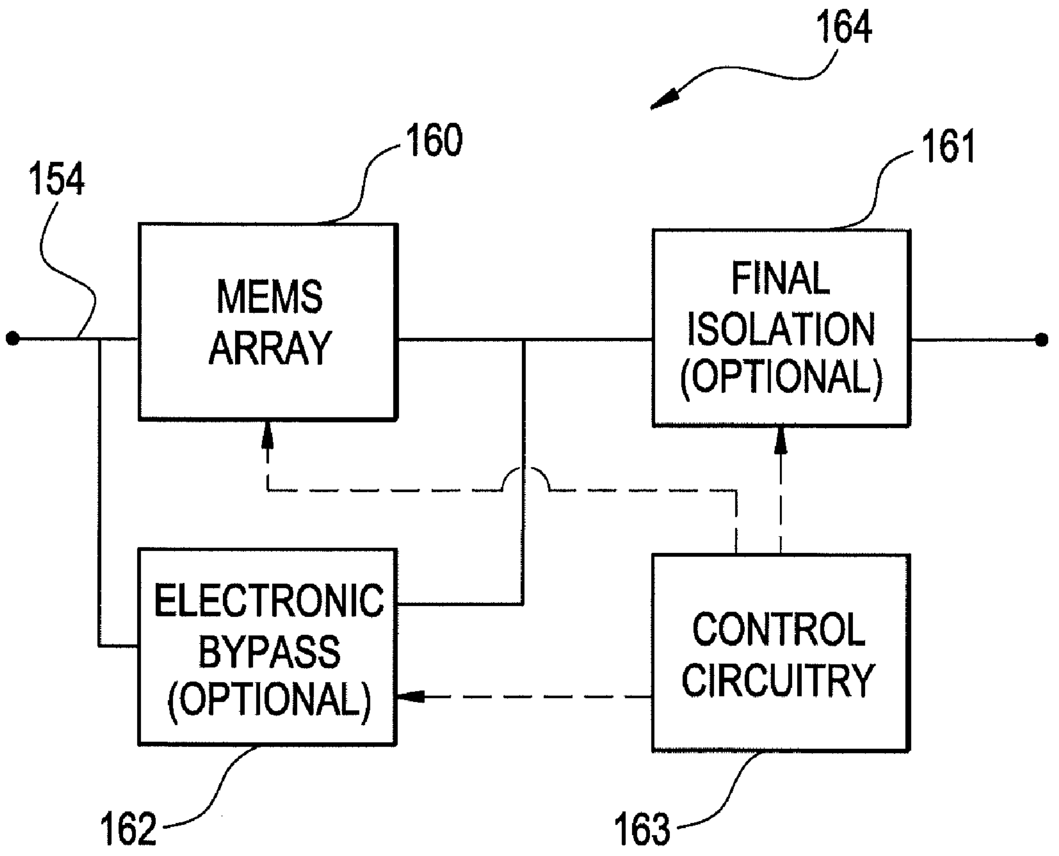
FIG. 8 is a block diagram of a current control device in accordance with an exemplary embodiment.

FIG. 8 is a block diagram of a current control device in accordance with another exemplary embodiment. As illustrated in FIG. 8, a current control device 164 may include a MEMS switch array 160 and control circuitry 163. The MEMS array 160 may include at least one MEMS switch pair arranged as discussed above with the source of each MEMS switch connected serially and to a single gate. For example, the MEMS array 160 may be the same as, or substantially similar to, the MEMS switch array 155 of FIG. 7, the MEMS based switching system 112 of FIG. 6, or any suitable MEMS switching system including arc suppression circuitry. As illustrated, the control circuitry 163 is integrally arranged with the current path 154 through at least the MEMS array 160. Further, as described above with regards to FIG. 5, the control circuitry may be integrally arranged with the current path through current sensing circuitry separate from the MEMS array circuitry.

In another exemplary embodiment, the current control device 164 may include a final isolation device 161. The final isolation device 161 may provide air-gap safety isolation of an electrical load on the current path 154. For example, the final isolation device may include a contactor or other interruption device, which may be opened in response to the MEMS array 160 changing switch conditions.

In another exemplary embodiment, the current control device 164 may further include an electronic bypass device 162. A bypass device may include one or more electronic components that shunt overload current away from the MEMS switches for a duration of the current overload. For example, the electronic bypass device 162 may receive overload current from the current path 154 in response to current overload. Therefore, the electronic bypass device 162 may extend the temporary overload rating of the current control device 164. It is noted that the current control device 164 may also include either or both of the final isolation device 161 and electronic bypass device 162.

Figure 9:
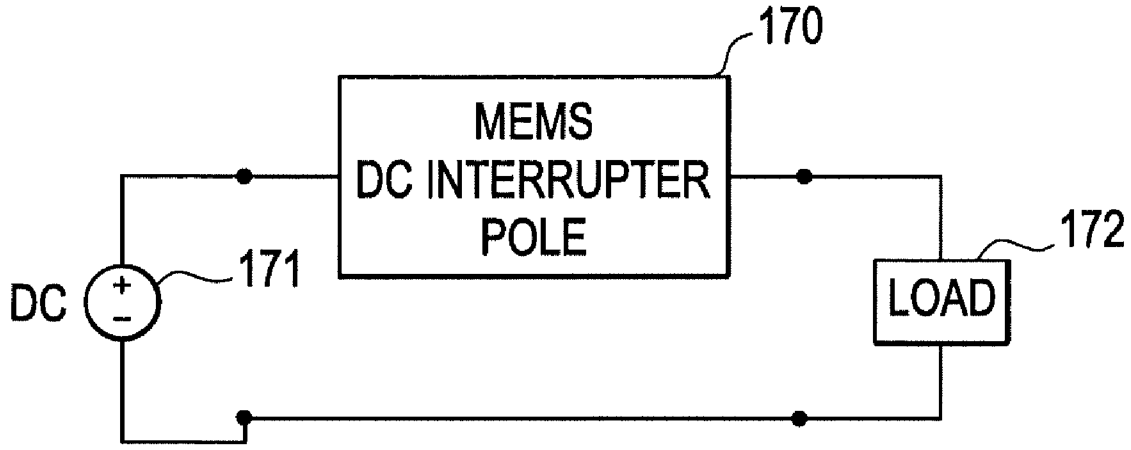
FIG. 9 is a block diagram of a single pole interrupter configuration in accordance with an exemplary embodiment.
Figure 10:
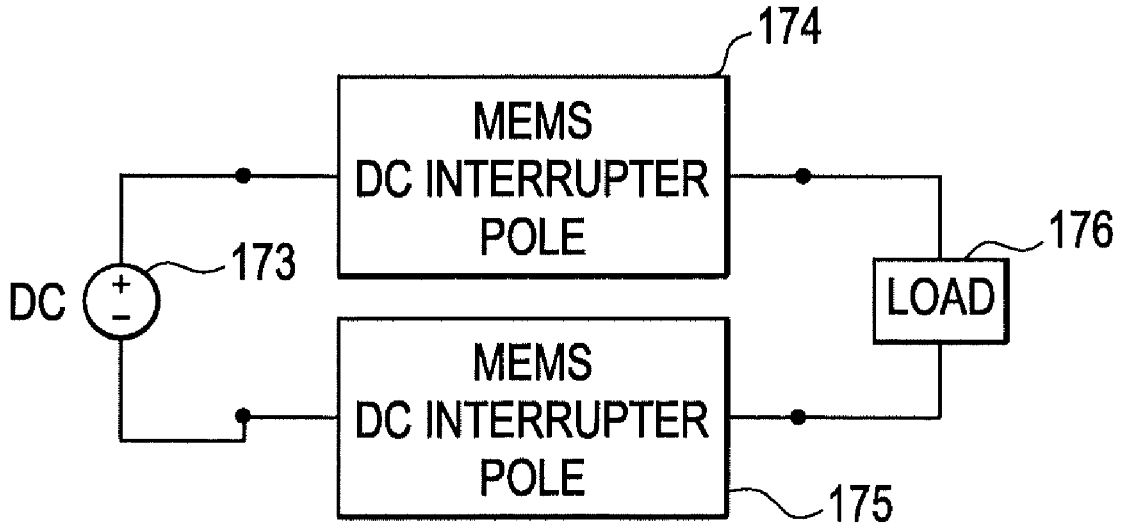
FIG. 10 is a block diagram of a double pole interrupter configuration in accordance with an exemplary embodiment.

As described hereinbefore, a current control device according to the exemplary embodiments may be used to interrupt current flow for both direct and alternating currents. Turning to FIGS. 9 and 10, example configurations of direct current control devices are illustrated.

FIG. 9 is a block diagram of a single pole interrupter configuration in accordance with an exemplary embodiment. As illustrated in FIG. 9, a MEMS interrupter pole 170 is arranged on a current path. The current path may include a voltage source 171 and a load 172. The MEMS interrupter pole 170 may interrupt current flow on the current path, thereby stopping the flow of current to the load 172. However, multiple MEMS interrupter poles may be used on current paths. Turning to FIG. 10, an example configuration including a plurality of MEMS interrupter poles is illustrated.

FIG. 10 is a pictorial diagram of a double pole interrupter configuration in accordance with another exemplary embodiment. As illustrated, MEMS interrupter poles 174 and 175 are arranged on a current path. Either of the MEMS interrupter poles may interrupt current flow on the current path. Similarly, both MEMS interrupter poles may interrupt current flow at substantially the same time. Such may be useful if additional interruption protection is deemed necessary. For example, MEMS interrupter poles 170, 174, and 175 may include current control devices as described hereinbefore.

Therefore, current control devices as described herein may include control circuitry integrally arranged with a current path, at least one MEMS switch pair disposed in the current path, a HALT circuit connected in parallel with the at least one MEMS switch pair facilitating arcless opening of the at least one MEMS switch, and a PATO circuit connected in parallel with the at least one MEMS switch pair facilitating arcless closing of the at least one MEMS switch.

Furthermore, example embodiments provide methods of controlling an electrical current passing through a current path. For example, the method may include transferring electrical energy from at least one MEMS switch pair to a HALT circuit connected in parallel with the at least one MEMS switch pair to facilitate opening the current path. The method may further include transferring electrical energy from the at least one MEMS switch pair to a PATO circuit connected in parallel with the at least one MEMS switch pair to facilitate closing the current path. Therefore, the exemplary embodiments may also provide arcless current control devices, and methods of arcless current control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A current control device comprising:

a first micro electromechanical system (MEMS) switch, said first MEMS switch having a source connection, a drain connection and a gate control electrode;

a second MEMS switch, said second MEMS switch having a drain connection, a source connection, and a gate control electrode, said second MEMS source connection being coupled to said first MEMS switch source connection, and a circuit electrically connected with said first and second MEMS switch facilitating opening of said first and second MEMS switch.

2. The current control device of claim 1 further comprising a gate driver coupled to said first and second MEMS gate control electrode.

3. The current control device of claim 2 wherein said gate driver is arranged to change said first and second MEMS switch from a first conductive state to a second conductive state.

4. The current control device of claim 3 wherein said first and second MEMS switches are arranged such that a hold-off voltage of the first and second MEMS switches is the sum of the hold-off voltages for each of the first and second MEMS switches.

5. The current control device of claim 4 wherein said circuit is a hybrid arcless limited technology (HALT) circuit.

6. The current control device of claim 1 further comprising a third and fourth MEMS switch serially coupled to each other and disposed in the current path, said third and fourth MEMS switch being electrically coupled in series to said first and second MEMS switch.

7. A current control device comprising:

a first pair of micro electromechanical system (MEMS), said first pair of MEMS switches including a first and second MEMS switch arranged in series with the source connections of said first and second MEMS switches being directly coupled;

a first gate driver coupled to said first pair of MEMS switches; and, a circuit electrically connected with said first gate driver switch facilitating opening of said first MEMS switch.

8. The current control device of claim 7 further comprising:

a second pair of MEMS switches, said second pair of MEMS switches including a third and fourth MEMS switch arranged in series with the source connections of said third and fourth MEMS switch being directly coupled; and, a second gate driver coupled to said second pair of MEMS switches, said second gate driver being electrically connected with said circuit.

9. The current control device of claim 8 wherein said second pair of MEMS switches is serially connected to said first pair of MEMS switches.

10. The current control device of claim 8 wherein said second pair of MEMS switches is connected in parallel to said first pair of MEMS switches.

11. The current control device of claim 9 wherein said circuit is a HALT circuit.

12. The current control device of claim 11 wherein the HALT circuit is configured to receive a transfer of electrical energy from the MEMS switch in response to the MEMS switch changing state from closed to open.

13. The current control device of claim 12 wherein the hold off voltage of the first pair of MEMS switches is a sum of hold-off voltages for said first and second MEMS switches.

14. The current control device of claim 13 wherein the hold off voltage of the first pair of MEMS switching is two times the hold-off voltage of said first MEMS switch.

15. A current control device comprising:

a first MEMS switch, said first MEMS switch having a drain connection and a source connection;

a second MEMS switch having drain connection, and a source connection, said second MEMS switch source connection being coupled to said first MEMS switch source connection;

wherein said first and second MEMS switch further have a single common gate connection coupled to said first and second MEMS switch source terminals, said gate connection being arranged to change the state of said first and second MEMS switch.

16. The current control device of claim 15 further comprising a gate driver coupled to said gate connection.

17. The current control device of claim 16 wherein said first and second MEMS switch each include a gate control electrode, each gate control electrode is directly coupled to said gate control connection.

18. The current control device of claim 17 wherein said gate driver includes means to transmit a gate activation signal to said gate control electrode.

19. The current control device of claim 18 wherein said first and second MEMS switch change state in response to said gate activation signal being transmitted to said gate control electrode.

20. The current control device of claim 19 wherein said gate activation signal is a control voltage.

* * * * *